Sept. 11, 1962  J. A. LAVALLEE  3,053,118
METHOD OF MANUFACTURING REAMERS
Filed April 29, 1960
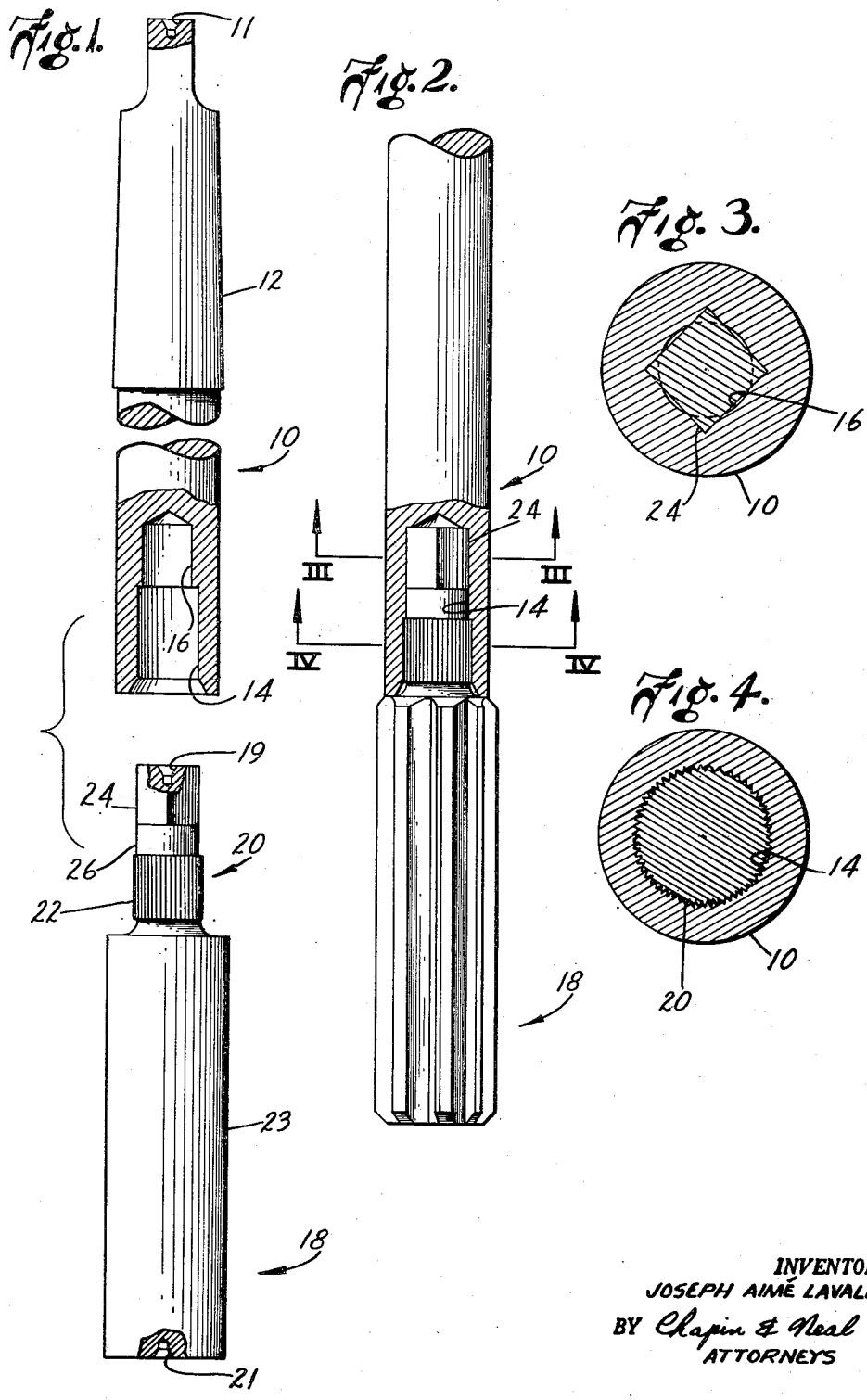
INVENTOR.
JOSEPH AIMÉ LAVALLEE
BY Chapin & Neal
ATTORNEYS 3,053,118
METHOD OF MANUFACTURING REAMERS
Joseph Aimé Lavallee, Springfield, Mass., assignor to Lavallee & Ide, Inc., Chicopee, Mass., a corporation of New York
Filed Apr. 29, 1960, Ser. No. 25,641
3 Claims. (Cl. 76—108)

The present invention relates to the art of reamer manufacture and an improved reamer construction.

It has become an accepted practice in the manufacture of reamers to join, by welding or brazing, a length of low-carbon, relatively inexpensive steel, to a length of high-speed steel which is relatively expensive. The high-speed steel end of this blank becomes the fluted cutting end of the reamer and the low-carbon steel end becomes the shank portion of the reamer. This practice has found widespread acceptance in reducing the cost of reamers and particularly larger sized reamers which are intended for use on the harder and tougher alloys.

While such compositely formed reamers are for the most part as reliable as any reamer formed from a single length of stock, there is always the possibility of a failure of the joint between the two ends of the reamer. In considering the possibility of reamer failure, it must be remembered that reaming is a finishing operation and it is not unusual for a part to represent a considerable investment when the reaming is performed. If anything should go amiss in reaming such an article, it is obvious that a very costly loss can result. Failure of the joint of a compositely formed reamer during the reaming operation can very well result in costly or irreparable damage to the workpiece. This possibility of failure is a real disadvantage. Actually there are many situations where the possibility of such reamer failure cannot be tolerated and therefore the much greater expense of reamers made from a single length of high-speed steel must be accepted.

The object of the present invention is to provide an improved method for forming composite reamers which retains the advantages of low cost resulting from the use of a relatively inexpensive shank joined to a length of high-speed steel or the like.

Another object of the invention is to provide a novel reamer construction formed in accordance with the method aspects of the invention which economically eliminates the chance of any failure in the joint between the two portions of such compositely formed reamers.

In accordance with the present method a reamer blank is formed by joining a length of low-carbon steel to a length of high-speed steel by means of a press or interference fit. More specifically, the length of high-speed steel which is to form the shank of the reamer has a two diameter axial hole in its outer end. The length of high-speed steel has a stem with a diameter matching that of the outer diameter of said axial hole. The stem is formed with a square cross section at its outer end, while the inner end of the axial hole is formed on a smaller diameter somewhat greater than the side of said square cross section. The inner portion of the stem is longitudinally knurled. The high-speed steel portion is hardened so that when the stem is forced into the axial hole of the shank portion, the square end section cuts into the wall defining the inner diameter, while the longitudinal knurling cuts into the wall defining the outer diameter of said axial hole. Both the square section and the longitudinally knurled portion are capable of transmitting torque from one portion of the reamer to the other. However, greater reliance is placed upon the square portion for torque transmission, while the knurled portion spaced therefrom gives flexural rigidity and strength to the composite structure. In the following specification preferred dimensional relationships will be given for the configuration of the telescoped portions of the two ends of the reamer.

The above and other related objects and features of the invention will be apparent from the following description of the disclosure found in the accompanying drawing and the particular novelty thereof pointed out in the appended claims.

In the drawing:
FIG. 1 is an elevation, partly in section, showing the two portions of a reamer blank, formed in accordance with the present invention;
FIG. 2 shows the assembled reamer;
FIG. 3 is a section, on an enlarged scale, taken along line III—III in FIG. 2; and
FIG. 4 is a section, on an enlarged scale, taken on line IV—IV in FIG. 2.

Referring first to FIG. 1, the shank of the reamer is indicated by reference character 10 and comprises a cylindrical piece of low-carbon, relatively soft, and relatively inexpensive steel. A tapered chucking portion 12 is formed at one end of the shank for use with a tapered chuck. Where a jaw chuck is to be used, the chucking portion of the shank would be formed with a straight cylindrical surface. In either event it is preferable to provide a center 11 in the end of the reamer. At the inner end of the shank 10, a two-diameter hole, indicated by reference characters 14 and 16, is formed on the axis of the shank concentrically of the tapered portion 12.

Reference is next made to a cutter 18 having a stem 20 formed on a reduced diameter at the upper end thereof. Preferably the cutter 18 is a piece of soft or unhardened, high-speed steel which is ground on centers 19 and 21 in order to obtain accurate concentricity between the cutting diameter 23 and the stem 20. After grinding, a portion 22 of the stem 20 is longitudinally knurled; then, according to the preferred sequence, the piece is heat-treated or hardened in accordance with standard practices for optimum strength characteristics. After hardening, the piece is again put on centers and flutes ground along the diameter 23. Also, the uppermost end of the reduced diameter 20 is ground to form a square portion 24. It will be noted that the knurled portion 22 stops short of the square portion 24 to leave a pilot portion 26.

After the two pieces have thus been formed, they are pressed together in the telescoped relation illustrated in FIGS. 2–4. It will be seen from FIG. 3 that the square portion 24 cuts into the diameter 16 of the shank 10 so as to form an effective key-like connection therebetween. It will further be seen from FIG. 4 that the knurled portion 24 cuts into the diameter 14 also forming a driving connection between the shank 10 and cutter 18. After being press-fitted together, the compositely formed reamer is then finish ground on the centers 11 and 21 in order to accurately obtain the desired effective cutting diameter of the fluted cutter and accurate concentricity of the chucking portion 12. Also the ends of the blades of the cutter portion are sharpened to finish the reamer so that it is ready for use.

It has been found that certain dimensional relationships now to be described are advantageous in obtaining an effective connection between the two portions of the reamer above described. For purposes of illustration, it will be assumed that the effective cutting diameter of the reamer is to be .500″ (the drawing is twice scale). The diameter of the shank portion at least immediately above the bladed portion of the reamer should be at least $\frac{1}{32}$″ smaller in diameter and preferably $\frac{1}{16}$″ smaller. Thus, the diameter of the shank portion of the reamer is 7/16". Next it has been found that the area of the stem 20 should be equal to the area of the portion of the shank receiving it, that is, 7/16" minus the diameter of the hole 14. With a 7/16" shank diameter, the diameter of the hole 14 and the stem 20 would theoretically be .274". This could closely be approximated by employing an I-drill having a diameter of .272". However, for practical purposes, it is sufficient to work to the nearest sixty-fourth of an inch. In the present example the diameter of hole 14 is 17/64" (.2656") and the stem 20 would have been originally ground to this same diameter. Preferably, the tolerances for the hole 14 and stem 20 would be such that there would be free fit therebetween. Thus, the dimensions of the hole 14 would be .2656" plus .0005" and the dimension of the stem 20 would be .2656" minus .0005". It has also been found preferable that a radius of approximately 1/16" be formed between the reduced diameter 20 and the outer end of the cutter portion 18. The knurling of the portion 20 is such as to raise the metal above the diameter of the reduced portion 20 in the order of .006". Thus, the maximum diameter of the knurled portion 22 would be approximately .277". The minimum axial length of the knurled portion 22 is preferably 1 diameter of the reduced portion 20, i.e. as illustrated, .2656" minimum. The pilot portion 26 has a minimum axial length in the order of 1/3 of the diameter of the stem portion 20 and is illustrated as 1/8". The axial length of the square portion has a minimum of approximately 2/3 the diameter of the reduced portion 20 and is illustrated as 1/4".

The generally accepted minimum for forming composite reamers is 1/2" though smaller sizes could be made. It is more likely that only larger sizes, up to 2" or more, would be used and in any event in the larger sizes the proportions would preferably remain the same as those given for the 1/2" size, as illustrated. For the sake of brevity the terms low-carbon steel and high-speed steel have been used to describe the materials for the shank and cutter respectively. It is, of course, to be understood that other equivalent materials could be used within the scope of the present teachings.

Having thus described the invention, what is novel and desired to be secured by Letters Patent of the United States is:

1. A method of manufacturing reamers having a low-carbon steel shank and a high-speed steel cutter comprising the steps of providing a shank by machining a length of low-carbon steel to form at one end thereof a diameter somewhat less than the cutting diameter of the reamer, said diameter being formed concentrically of the opposite or chucking end of the shank, forming a two-diameter axial hole extending inwardly from said one end of the shank and concentric of the other end of the shank, the diameter of the inner portion of said hole being greater than the diameter of the outer portion thereof and providing a cutter by machining a length of high-speed steel while in a soft condition to form at one end thereof a diameter approximating the desired cutting diameter of the reamer, and a stem at the other end having a diameter matching that of the outer portion of said axial hole, forming straight knurling on said stem through a length spaced inwardly from the outer end thereof, forming flutes on said one end of the cutter, forming a square section on the outer end of the stem with the side of the square being slightly less than the diameter of the inner portion of said axial hole, heat treating said cutter for optimum strength and hardness characteristics and after hardening forcibly inserting the stem of said cutter into said axial hole a distance sufficient for the square section to cut into the wall of said inner portion and sufficient for the knurling to cut into the wall of said outer portion thereby rigidly joining together the shank and cutter for subsequent reaming operations.

2. A method of manufacturing reamers having a low-carbon steel shank and a high-speed steel cutter comprising the steps of providing a shank by machining a length of low-carbon steel to form at one end thereof a diameter somewhat less than the cutting diameter of the reamer said diameter being concentric of the opposite or chucking end of the shank, forming a two-diameter axial hole extending inwardly from said one end of the shank and concentric of the other end of the shank, the first or outer portion of said hole having a diameter such that the cross sectional area of the shank material surrounding said first portion approximates the cross sectional area of the hole, the diameter of the second or inner portion of the hole being slightly greater than the side of a square circumscribed by the first diameter, and providing a cutter by machining a length of high-speed steel while in a soft condition to form at one end thereof a diameter approximating the desired cutting diameter of the reamer and a stem at the other end having a diameter matching that of the said outer portion of said hole, forming straight knurling on said stem through a length spaced inwardly from the outer end thereof, thereafter heat treating the cutter for optimum strength and hardness characteristics then forming flutes on the diameter at said one end and forming a square section on the outer end of the stem with the square section being circumscribed by the diameter of the stem, the axial length of the square section stopping short of the knurled portion leaving a pilot portion on said stem, and forcibly inserting the stem of said cutter into said axial hole a distance sufficient for said square section to cut into the wall defining said inner portion and sufficient for the knurling to cut into the wall defining said outer portion thereby rigidly joining together the shank and cutter for subsequent reaming operations.

3. A method as in claim 2 wherein the axial length of the knurling is made at least equal to the diameter of the stem, the knurling increases the diameter of the stem .006" on a side, the axial length of the square portion is formed with a minimum length of 2/3 the diameter of the stem and the pilot portion has a minimum length of 1/3 the diameter of the stem.

References Cited in the file of this patent

UNITED STATES PATENTS

| 871,154 | Wood | Nov. 19, 1907 |
| 1,570,049 | Dillard | Jan. 19, 1926 |
| 1,687,019 | Hallberg | Oct. 9, 1928 |
| 2,111,799 | Newpher | Mar. 22, 1938 |
| 2,147,343 | Hokanson | Feb. 14, 1939 |
| 2,326,091 | Zabriskie | Aug. 3, 1943 |
| 2,345,910 | Fawcett | Apr. 4, 1944 |
| 2,421,490 | Evans | June 3, 1947 |
| 2,537,818 | Evans | Jan. 9, 1951 |
| 2,590,766 | Githens | Mar. 25, 1952 |
| 2,936,659 | Garberding | May 17, 1960 |
| 2,940,342 | Lavallee | June 14, 1960 |

FOREIGN PATENTS

| 189,583 | Germany | Oct. 14, 1907 |